United States Patent
Muraoka

(10) Patent No.: US 9,981,710 B2
(45) Date of Patent: May 29, 2018

(54) SUSPENSION STRUCTURE OF SADDLE-RIDE TYPE VEHICLE

(71) Applicant: SUZUKI MOTOR CORPORATION, Hamamatsu-Shi, Shizuoka (JP)

(72) Inventor: Tetsuo Muraoka, Hamamatsu (JP)

(73) Assignee: SUZUKI MOTOR CORPORATION, Hamamatsu-Shi, Shizuoka (JP)

( * ) Notice: Subject to any disclaimer, the term of this patent is extended or adjusted under 35 U.S.C. 154(b) by 12 days.

(21) Appl. No.: 15/241,205

(22) Filed: Aug. 19, 2016

(65) Prior Publication Data

US 2017/0057588 A1 Mar. 2, 2017

(30) Foreign Application Priority Data

Aug. 28, 2015 (JP) ................................ 2015-169737

(51) Int. Cl.
*B62K 21/20* (2006.01)
*B62K 21/02* (2006.01)

(52) U.S. Cl.
CPC .............. *B62K 21/20* (2013.01); *B62K 21/02* (2013.01)

(58) Field of Classification Search
CPC .... B62J 1/02; B62J 1/06; B62K 21/20; B62K 21/14
See application file for complete search history.

(56) References Cited

U.S. PATENT DOCUMENTS

| | | | | |
|---|---|---|---|---|
| 771,841 A | * | 10/1904 | Sills ....................... | B62K 21/14 74/551.2 |
| 3,208,767 A | * | 9/1965 | Moulton ................ | B62K 21/06 267/33 |
| 3,936,076 A | * | 2/1976 | Probst ........................ | B62J 1/06 267/147 |
| 4,815,763 A | * | 3/1989 | Hartmann .............. | B62K 21/20 280/275 |
| 4,881,750 A | * | 11/1989 | Hartmann .............. | B62K 21/20 188/269 |
| 5,201,244 A | * | 4/1993 | Stewart .................. | B62K 21/20 280/276 |

(Continued)

FOREIGN PATENT DOCUMENTS

DE 199 00 416 A1 7/2000
DE 20 2007 007 190 U1 8/2007

(Continued)

OTHER PUBLICATIONS

Office Action dated Sep. 5, 2017 during the prosecution of DE10 2016 115 712.0.

*Primary Examiner* — Kevin Hurley
(74) *Attorney, Agent, or Firm* — Troutman Sanders LLP

(57) ABSTRACT

A shock absorber has an inner tube embedded in a steering stem shaft and an outer tube provided slidably. A front fork is fixed to a lower end of the outer tube, and the inner tube is fixed to an upper end of the steering stem shaft. The steering stem shaft is provided with a guide trench extending in a telescoping direction and having a long hole shape. A roller bearing is provided on an outer circumferential surface of the outer tube and is inserted into the guide trench movably along the guide trench. As a result, relative movement between the steering stem shaft and the outer tube in the telescoping direction is permitted while relative rotation is restricted.

4 Claims, 4 Drawing Sheets

(56) References Cited

U.S. PATENT DOCUMENTS

| | | | | |
|---|---|---|---|---|
| 5,308,099 A | * | 5/1994 | Browning | B62K 21/20 188/319.2 |
| 5,494,302 A | * | 2/1996 | Farris | B62K 21/20 280/276 |
| 5,911,428 A | * | 6/1999 | Ueda | B62K 21/20 280/276 |
| 7,011,325 B2 | * | 3/2006 | Kinzler | B62K 21/20 188/322.15 |
| 2001/0045721 A1 | | 11/2001 | Heydenreich | |
| 2014/0319789 A1 | | 10/2014 | Murakami | |
| 2017/0008596 A1 | * | 1/2017 | D'Aluisio | B62K 21/20 |

FOREIGN PATENT DOCUMENTS

| | | | |
|---|---|---|---|
| DE | 10 2006 008 992 A1 | | 9/2007 |
| JP | 11059544 A | * | 3/1999 |
| JP | 2014213740 A | | 11/2014 |

\* cited by examiner

SUSPENSION STRUCTURE OF SADDLE-RIDE TYPE VEHICLE

CROSS-REFERENCE TO RELATED APPLICATIONS

This application is based upon and claims the benefit of priority of the prior Japanese Patent Application No. 2015-169737, filed on Aug. 28, 2015, the entire contents of which are incorporated herein by reference.

BACKGROUND OF THE INVENTION

Field of the Invention

The present invention relates to a suspension structure for supporting a wheel in a saddle-ride type vehicle.

Description of the Related Art

As a suspension structure for a front wheel of a motorcycle, a structure in which left and right front forks (telescopic forks) are supported by an under-bracket, and a steering angle is switched using a steering stem shaft fixed to the under-bracket is known in the art (for example, see Japanese Laid-open Patent Publication No. 2014-213740).

CITATION LIST

Patent Documents

[Patent Document 1] Japanese Laid-open Patent Publication No. 2014-213740

In a suspension structure for a front wheel of a motorcycle of the prior art, a pair of front forks are assembled with a suspension mechanism. Therefore, the number of components and the unsprung weight inevitably increase. In addition, this significantly restricts an exterior design of the motorcycle.

In this regard, for example, if a single suspension mechanism can be assembled with a steering stem shaft, it is possible to reduce the number of components and the unsprung weight. Furthermore, it is possible to improve the degree of freedom in the exterior design of the motorcycle.

Meanwhile, in order to configure the suspension mechanism, it is necessary to assemble tubular members in a telescopic manner, so that relative rotation is allowed in that portion. For this reason, if the suspension mechanism is assembled with the steering stem shaft, a relatively rotatable portion is formed. As a result, a driver may fail to transmit a handle control to the front wheel.

SUMMARY OF THE INVENTION

In view of the aforementioned problems, it is therefore an object of the present invention to provide a suspension structure of a saddle-ride type vehicle for supporting a wheel, capable of maintaining a positional relationship between both end members.

According to an aspect of the present invention, there is provided a suspension structure of a saddle-ride type vehicle for supporting a wheel, the suspension structure including: a first tubular member; and a second tubular member slidably provided inside the first tubular member, wherein any one of the first and second tubular members is provided with a guide trench extending in a telescoping direction of the first and second tubular members, and the other one of the first and second tubular members is provided with an engagement portion inserted into the guide trench and movable along the guide trench in order to permit relative movement between the first and second tubular members in the telescoping direction while restricting relative rotation.

In the suspension structure of the saddle-ride type vehicle described above, the guide trench may be provided in the first tubular member, and the engagement portion may be provided in the second tubular member.

In the suspension structure of the saddle-ride type vehicle described above, the engagement portion may be a rolling bearing and have a rotation axis arranged to match a radial direction of the second tubular member.

In the suspension structure of the saddle-ride type vehicle described above, a plurality of the guide trenches and a plurality of the engagement portions may be arranged evenly along a circumferential direction of the first and second tubular members.

In the suspension structure of the saddle-ride type vehicle described above, the first tubular member may be a steering stem shaft, the second tubular member may be an outer tube of a shock absorber, a front fork supporting the front wheel may be fixed to the outer tube, and an inner tube configured to access the outer tube in a telescopic manner may be fixed to the steering stem shaft.

DETAILED DESCRIPTION OF THE PREFERRED EMBODIMENTS

Preferred embodiments of the present invention will now be described with reference to the accompanying drawings.

Figure 1:
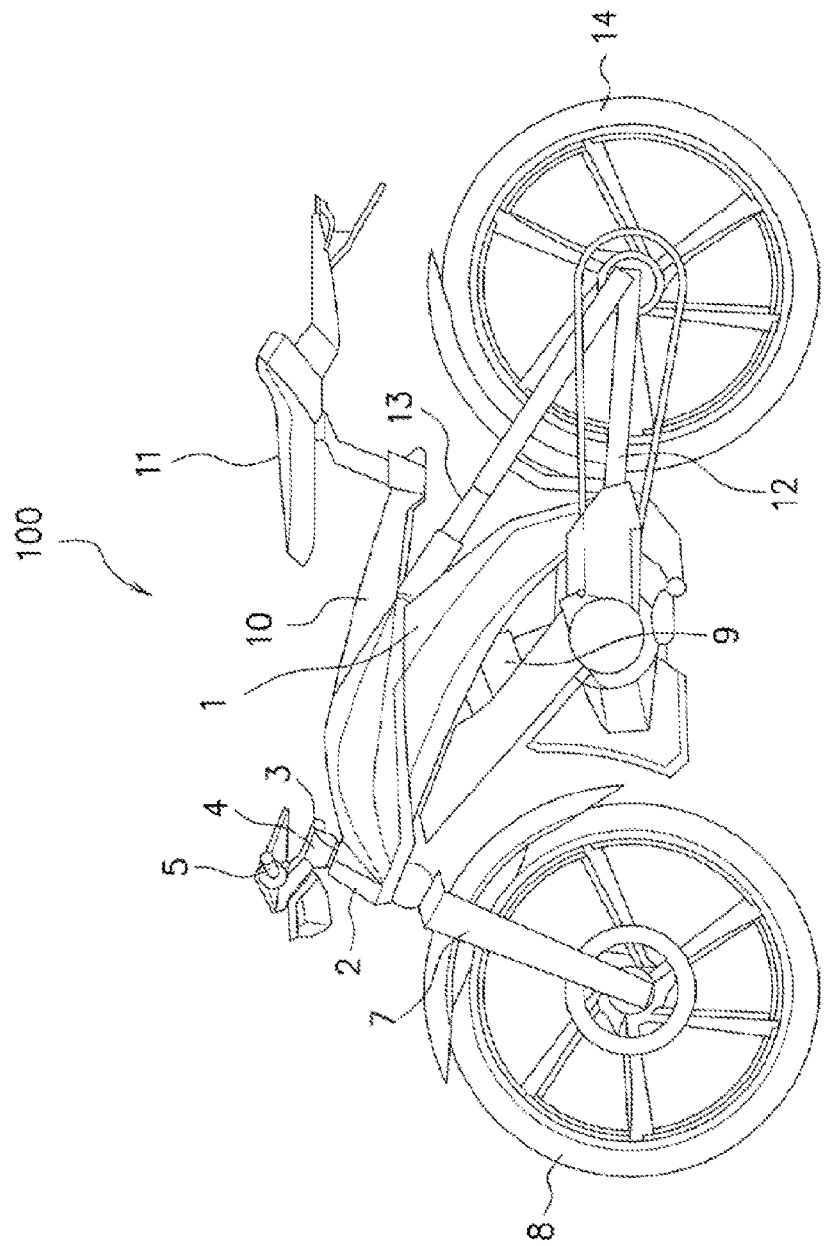
FIG. 1 is a side view illustrating a schematic configuration of a motorcycle according to an embodiment of the invention.

FIG. 1 is a side view illustrating a motorcycle 100 as an exemplary saddle-ride type vehicle according to the present invention.

In a front part of a chassis 1 formed of steel products or aluminum alloys, a steering head pipe 2 supports a steering stem shaft pivotably to the left or right. On top of the steering stem shaft 3, a handle bar 5 is fixed by interposing a top bridge 4. In addition, although described below in more detail with reference to FIGS. 2 and 3, a front fork 7 is provided in the lower end of the steering stem shaft by interposing a shock absorber 6 serving as a suspension mechanism. According to this embodiment, the front fork 7 extends to the left side of the vehicle and rotatably supports the front wheel 8 as a steering wheel in a cantilevered manner.

The chassis 1 extends rearward and downward from the steering head pipe 2, and an engine 9 is mounted to the chassis 1. In addition, a seat frame 10 extends rearward from the chassis 1 to support a seat 11. Swing arms 12 are assembled vertically swingably in the rear part of the chassis 1, and the shock absorber 13 is suspended between the chassis 1 and the swing arms 12. A rear wheel 14 is rotatably supported by the rear ends of the swing arms 12. The rear wheel 14 is rotatably driven using a driven sprocket where a chain capable of transmitting engine power is looped.

Figure 2:
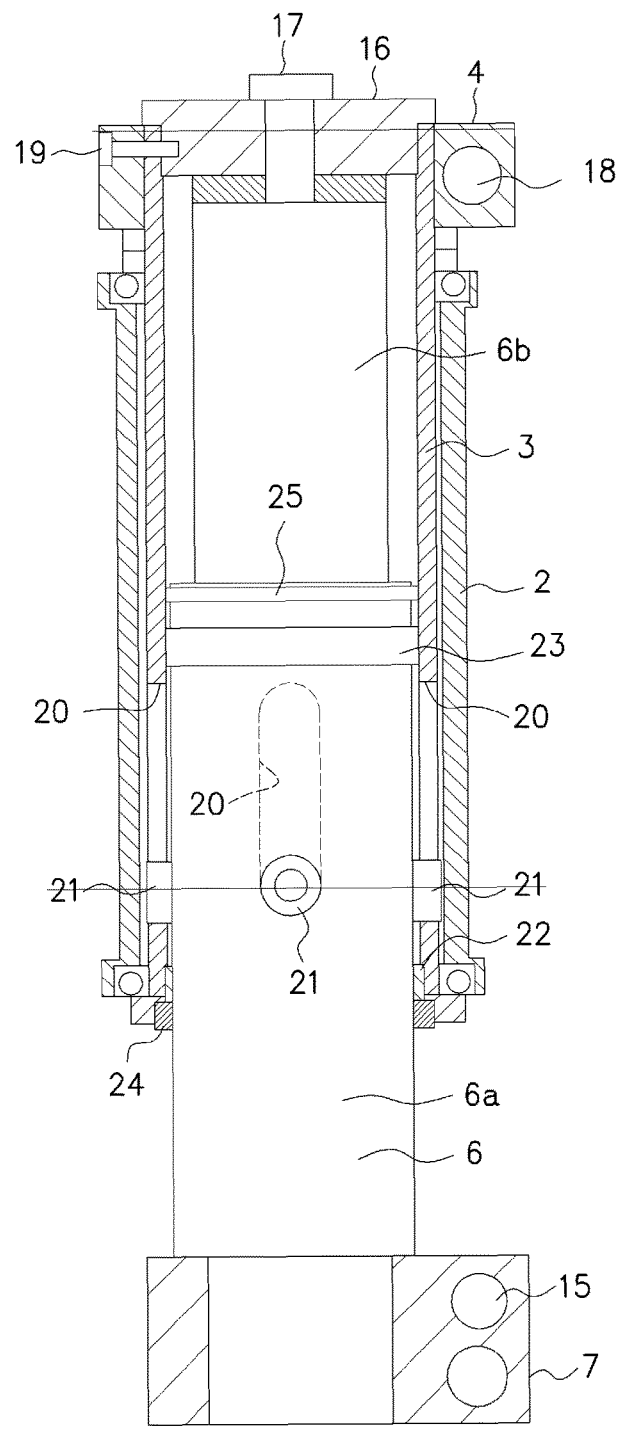
FIG. 2 is a diagram illustrating a schematic configuration of a suspension structure according to an embodiment of the invention.
Figure 3:
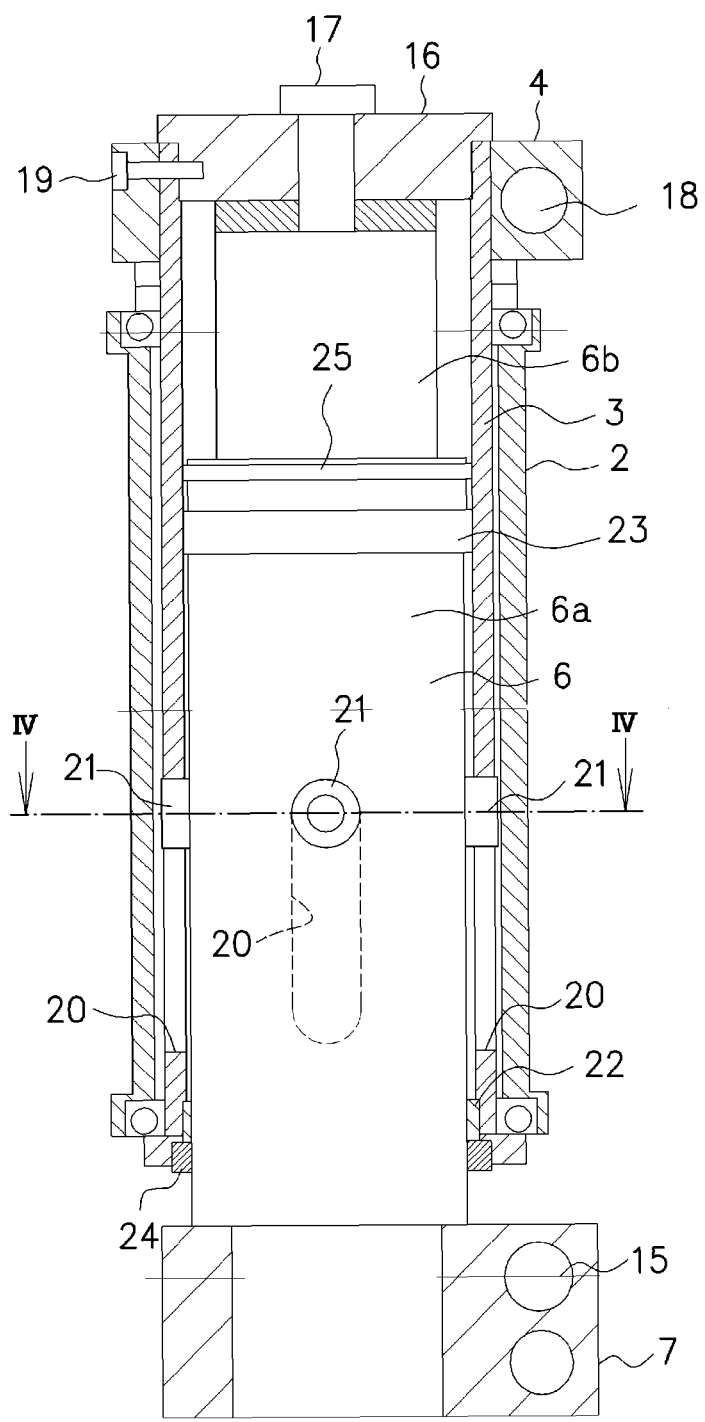
FIG. 3 is a diagram illustrating a schematic configuration of a suspension structure according to an embodiment of the invention.

FIGS. 2 and 3 illustrate a schematic configuration of the suspension structure according to an embodiment of the invention. FIG. 2 illustrates a full expanding state of the shock absorber 6, and FIG. 3 illustrates a full contracting state of the shock absorber 6.

The steering stem shaft 3 is supported by the steering head pipe 2 pivotably to the left and right.

An upright shock absorber 6 is embedded in the steering stem shaft 3 in a coaxial manner. The shock absorber 6 is an oil shock absorber mounted with a suspension spring and has an outer tube 6a and an inner tube 6b that accesses the outer tube 6a in a telescopic manner. During driving of the motorcycle, a shock received from a road surface through the front wheel 8 is absorbed by the suspension spring, and the shock absorber 6 damps out the vibration. Note that any structure known in the art may be employed in the oil shock absorber mounted with the suspension spring, and those are not described herein for simplicity purposes.

More specifically, the inner tube 6b is embedded in the steering stem shaft 3, and the outer tube 6a is slidably provided inside the steering stem shaft 3.

The outer tube 6a accesses the steering stem shaft 3 from the lower end. The front fork 7 is fixed to the lower end of the outer tube 6a by either of press fitting or fastening of a bolt 15.

The inner tube 6b is fixed to the upper end of the steering stem shaft 3. Here, the end portion of the inner tube 6b is fixed by fastening a cap 16 or a bolt 17 screwed to the upper end of the steering stem shaft 3.

A top bridge 4 is fixed to the upper end of the steering stem shaft 3 by fastening a bolt 18, and a bolt 19 disposed in front of the top bridge 4 stops rotation.

The steering stem shaft 3 is provided with a guide trench 20 having a long hole shape and extending in a telescoping direction of the steering stem shaft 3 and the outer tube 6a. According to this embodiment, four guide trenches 20 are arranged around the circumferential direction of the steering stem shaft 3 evenly, that is, at a phase angle of 90°.

A roller bearing 21 as a rolling bearing is arranged in the outer circumferential surface of the outer tube 6a. Similar to the guide trenches 20, four roller bearings 21 are arranged around the circumferential direction of the outer tube 6a evenly, that is, at a phase angle of 90°. In addition, each roller bearing 21 is inserted into each guide trench 20 so that it can move along the guide trench 20.

The rotation axis of the roller bearing 21 is arranged to match a radial direction of the outer tube 6a, so that the roller bearing 21 can roll while it comes in contact with a side surface of the guide trench 20. In this structure, the most part of the roller bearing 21 in the thickness direction can be positioned inside the guide trench 20. As a result, the inner circumferential surface of the steering stem shaft 3 and the outer circumferential surface of the outer tube 6a can approach each other, so that the outer tube 6a is allowed to have a large diameter. This is advantageous in strength or rigidity.

Figure 4:
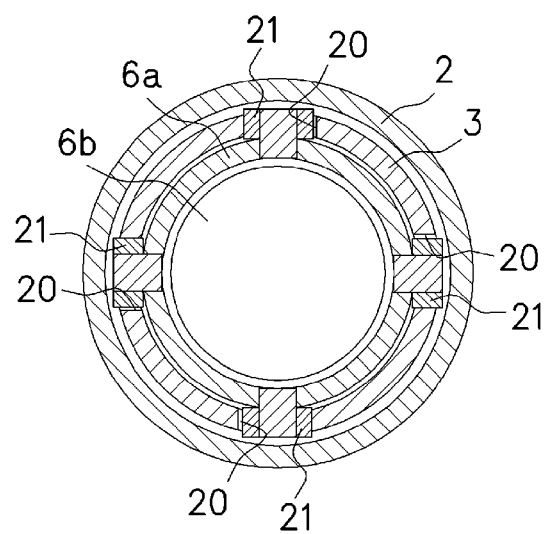
FIG. 4 is a diagram illustrating an exemplary cross-sectional structure taken along the line IV-IV of FIG. 3.

Here, FIG. 4 illustrates an exemplary cross-sectional structure taken along the line IV-IV of FIG. 3. Note that FIG. 4 is a schematic diagram, and an internal configuration of the inner tube 6b is not described herein for simplicity purposes. As illustrated in FIG. 4, the width of the guide trench is larger than the diameter of the roller bearing 21, and the roller bearing 21 makes sliding contact with one of the side surfaces of the guide trench 20. In this case, if the roller bearing 21 makes sliding contact with one of the side surfaces of the guide trench 20 (one of circumferential side surfaces of the steering stem shaft 3), the roller bearing 21 makes sliding contact with the opposite side surface in a neighboring guide trench 20 (the side surface opposite to that of the one circumferential side surface of the steering stem shaft 3). In this manner, the side surface of the guide trench 20 that makes sliding contact is selected in an alternating manner between the neighboring roller bearings 21. As a result, it is possible to suppress rattling between the steering stem shaft 3 and the outer tube 6a in the rotational direction and achieve satisfactory rotational movement of the roller bearing 21.

Using the guide trenches 20 and the roller bearing 21 having the aforementioned configuration, relative movement between the steering stem shaft 3 and the outer tube 6a in a telescoping direction is permitted while the relative rotation is restricted.

A slidable metal ring 22 is provided on the inner circumferential surface in the vicinity of the lower end of the steering stem shaft 3. In addition, a slidable metal ring 23 is provided on the outer circumferential surface in the vicinity of the upper end of the outer tube 6a. As a result, the steering stem shaft 3 and the outer tube 6a can support each other in a slidable manner. Therefore, it is possible to suppress rattling that may be difficult to suppress only using the roller bearing 21.

An oil seal 24 is provided on the inner circumferential surface of the lower end of the steering stem shaft 3, that is, under the slidable metal ring 22. In addition, an oil seal 25 is provided on the outer circumferential surface of the upper end of the outer tube 6a, that is, over the slidable metal ring 23. Grease is inserted into the space enclosed by the oil seals 24 and 25, so that sliding movement between the steering stem shaft 3 and the outer tube 6a is lubricated.

As described above, using the guide trench 20 and the roller bearing 21, relative movement between the steering stem shaft 3 and the outer tube 6a in a telescoping direction is permitted. Therefore, the functionality of the suspension mechanism is not degraded. In addition, relative rotation between the steering stem shaft 3 and the outer tube 6a is restricted using the guide trench 20 and the roller bearing 21. Therefore, a positional relationship between both end members is maintained. As a result, by manipulating the handle bar 5 fixed to the top bridge 4, it is possible to steer the front forks 7 and the front wheel 8 and change the steering angle.

Since the suspension mechanism is assembled with the steering stem shaft 3, it is possible to reduce the number of components and the unsprung weight, compared to a case where the suspension mechanism is assembled with a pair of front forks. Furthermore, it is possible to improve the degree of freedom in an exterior design of a motorcycle.

While preferred embodiments of the invention have been described and illustrated hereinbefore, it should be understood that they are only for exemplary purposes and are not to be construed as limitations, and any addition, omission, substitution, or modification may be possible without departing from the spirit or scope of the present invention.

Although a motorcycle having a front wheel suspension structure has been described in the aforementioned embodiment, the present invention may be employed in any structure without a limitation. For example, the present invention may be employed in a three-wheeled or four-wheeled vehicle, or wheels other than the front wheel.

Although only one front fork 7 rotatably supports the front wheel 8 in the aforementioned embodiment by way of example, a pair of front forks may also rotatably support the front wheel.

Although a first tubular member according to the present invention is the steering stem shaft 3, and a second tubular member according to the present invention is the outer tube 6a in the aforementioned embodiment, for example, the first tubular member may be the outer tube 6a, and the second tubular member may be the inner tube 6b. Furthermore, although the upright shock absorber 6 has been described by way of example, an inverted shock absorber may also be employed.

Although the oil shock absorber mounted with a suspension spring has been described in the aforementioned embodiment, the suspension spring may be provided separately from the oil shock absorber. For example, the suspension spring may be disposed between the steering stem shaft 3 and the front fork 7 outside the outer tube 6a.

According to the present invention, using the suspension structure of the saddle-ride type vehicle for supporting a wheel, it is possible to perform relative movement between the first and second restricting relative rotation. Therefore, it is possible to maintain a positional relationship between both end members.

What is claimed is:

1. A suspension structure of a saddle-ride type vehicle for supporting a wheel, the suspension structure comprising:
   a first tubular member; and
   a second tubular member slidably provided inside the first tubular member,
   wherein the first tubular member is provided with a guide trench extending in a telescoping direction of the first and second tubular members,
   wherein the second tubular member is provided with an engagement portion inserted into the guide trench and movable along the guide trench, and
   wherein the engagement portion is a rolling bearing and comprises a rotation axis arranged to match a radial direction of the second tubular member in order to permit relative movement between the first and second tubular members in the telescoping direction while restricting relative rotation.

2. The suspension structure of the saddle-ride type vehicle according to claim 1, wherein a plurality of the guide trenches and a plurality of the engagement portions are arranged evenly along a circumferential direction of the first and second tubular members.

3. The suspension structure of the saddle-ride type vehicle according to claim 1, wherein the first tubular member is a steering stem shaft,
   the second tubular member is an outer tube of a shock absorber,
   a front fork supporting a front wheel is fixed to the outer tube, and
   an inner tube configured to access the outer tube in a telescopic manner is fixed to the steering stem shaft.

4. The suspension structure of the saddle-ride type vehicle according to claim 1,
   wherein the first tubular member is an outer tube of a shock absorber,
   wherein the second tubular member is an inner tube of the shock absorber,
   wherein a front fork supporting a front wheel is fixed to the outer tube, and
   wherein an inner tube configured to access the outer tube in a telescopic manner is fixed to the steering stem shaft.

* * * * *